United States Patent [19]
Beeman

[11] 4,018,991
[45] Apr. 19, 1977

[54] MULTIFREQUENCY SIGNAL PARITY DETECTOR

[75] Inventor: Robert H. Beeman, Berkeley, Ill.

[73] Assignee: GTE Automatic Electric Laboratories Incorporated, Northlake, Ill.

[22] Filed: Dec. 29, 1975

[21] Appl. No.: 644,668

[52] U.S. Cl. .......................................... 179/84 VF
[51] Int. Cl.² ........................................ H04M 1/50
[58] Field of Search ........ 179/84 VF, 84 R, 18 AD; 328/137, 138, 139

[56] References Cited
UNITED STATES PATENTS

| | | | |
|---|---|---|---|
| 3,128,349 | 4/1964 | Boesch | 179/84 VF |
| 3,140,357 | 7/1964 | Bischof | 179/84 VF |
| 3,288,940 | 11/1966 | Bennett | 179/84 VF |
| 3,916,115 | 10/1975 | Tarr | 179/84 VF |

*Primary Examiner*—William C. Cooper
*Assistant Examiner*—Joseph A. Popek
*Attorney, Agent, or Firm*—Robert J. Black

[57] ABSTRACT

A parity checking circuit for use in multifrequency tone receivers is disclosed wherein associated receivers are made less susceptible to digit simulation when talking is present, by verifying that the same two tones are present for the entire parity timing period.

10 Claims, 1 Drawing Figure

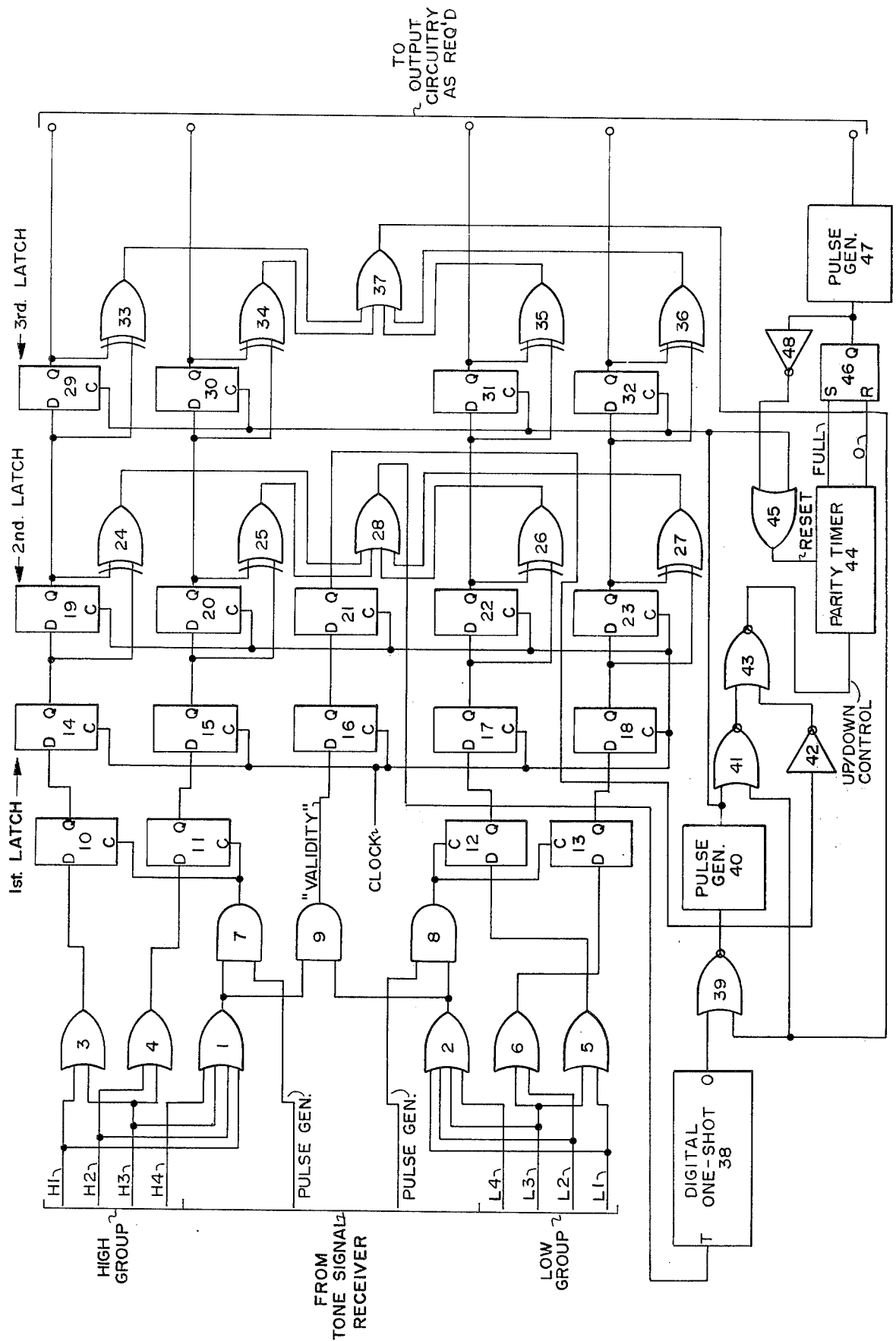

MULTIFREQUENCY SIGNAL PARITY DETECTOR

BACKGROUND OF THE INVENTION

1. Field of the Invention

This invention pertains to multifrequency tone receivers as used in telecommunication systems and more particularly to an improved parity checking circuit for use with tone receivers.

2. Description of the prior Art

Multifrequency signaling in telephone systems has become quite common because of the advantages provided over interrupted direct current signaling. The principle advantage of this type of system is the speed and accuracy with which a subscriber may operate a pushbutton telephone subset. In such systems multifrequency signal bursts each indicative of a digit are generated at a telephone substation and received by a signal receiver. This signal receiver separates the component frequencies of the signal bursts and indicates their presence to register apparatus. The signal receiver also includes apparatus for timing a minimum signal duration before allowing signals to be registered. This prevents a false indication of a digit due to other voice frequency signals in the transmission network (including noise). At the end of the predetermined time interval the signal detecting apparatus is operated to provide an output to the register.

To guard against false outputs one method of tone decoding requires the presence of two valid tones for a certain minimum duration. The presence of such two valid tones is commonly called parity and a parity timer insures that the two tones are present for the required time.

In such multifrequency signaling systems it is common to utilize eight tones divided into two groups of four tones each. The low group is made up of the four lower tones and the high group made up of the four higher tones. A valid tone pair then is made up of one tone from each group. In many existing multifrequency receivers, the low group detector outputs are combined through an OR gate and the high group detector outputs are also combined through a different OR gate. These signals indicating that a detector in their group is on, are then fed into a common AND gate. A true output from the AND gate indicates that a tone from each group is present and a parity condition exists. Examples of this form of parity detection are found in U.S. Pat. No. 3,140,357 to W. Bischof et al and U.S. Pat. No. 3,288,940 to G. H. Bennett et al.

Another form of tone detector exemplified by U.S. Pat. No. 3,128,349 to F. P. Boesch et al teaches that once a tone is detected in either high or low group all other tones are inhibited for the duration of the timing period established by an associated timer. In this manner if a false signal is followed immediately by a valid signal, the valid signal may be missed.

In circuits like those described above, no means are present for insuring that the two tones being timed at the end of parity are the same two that initiated operation of the parity timer. For example if both high and low group detectors give outputs, the parity timer is started. If during parity timing the high group detector for one tone, turns off and the high group detector for a second high group tone turns on before an interdigital pause is recognized, parity timing will continue and valid parity detection will be made, even though the same two tones were not present for the required time.

Circuitry to insure that the same two tones (one in each group) are present for the entire parity timing period is disclosed in U.S. Pat. No. 3,916,115 to L. A. Tarr. Tarr discloses a DTMF receiver containing circuits with eight detector outputs — one detector output for each of the eight standard touch calling frequencies. He further discloses a circuit in which each detector in a given group is associated with a flip-flop which is set when a detector turns on. The setting of a flip-flop resets the other flip-flops in that group and resets a parity timer. The parity timer reset is accomplished by an R-C differentiator on the output of each flip-flop connecting to a single gate which produces a reset pulse when a flip-flop is set. A validity or parity lead indicates whether one detector from each group is on or not.

There are two problems with this approach to the problem — both relating to difficulties in large scale integrated circuit (LSI) implementation. The first is that there is a separate output lead for each detector. If it is necessary to have the parity timer on a different LSI chip from the detector, this results in an excessive number of input and output pins. Secondly, an RC differentiator does not lend itself to LSI implementation and the function must be performed by another device. In addition, the analog parity timer must be implemented by digital means on an LSI chip.

SUMMARY OF THE INVENTION

The present invention has two groups of four detectors each. There is one detector for each touch calling frequency. The identity of the detector in a given group which is "on" is encoded into a 2 bit binary code by gates, reducing the number of leads per detector group from four to two.

The outputs of these gates are applied to four D flip-flops. The two which store low group information are clocked by detection of a low group frequency, and the two which store high group information are clocked by detection of a high group frequency. A validity signal is produced by OR and AND gates which produce a "True" signal when one and only one detector is on in each group. Changes in the code for either group are detected by applying each bit of the code to a first set of clocked D flip-flops or latches to cause any code changes at the output of this first latch to be synchronous with the clock. The valid lead is also applied to a latch for this purpose. The output of this first latch feeds a similar second latch clocked by the same clock. A set of four Exclusive OR gates with their inputs connected to the inputs and outputs of this second latch give 0 outputs if there has been no code change during the previous clock period and 1 if there has been.

The outputs of these Exclusive OR gates are OR'ed together to produce a signal which indicates whether a code change has occurred. A third stage of latches stores the latest estimate of the code being received. The input of this latch is connected to the output of the second latch, and also has Exclusive OR gates connected between inputs and outputs. This third latch is clocked by the output of a digital timer which is started by a "Code Change" signal from a code change timer. This code change timer performs the function of a retriggerable one shot. When a code change occurs the code change timer is triggered. During the time after triggering but before time out a parity timer consisting of a resettable up/down count receives a "count down" signal regardless of the status of the validity lead. When time out occurs on the code change timer, the Exclusive OR gates across the third latch sense whether the code being received from the second latch is the same as that in the third latch. If it is, control of whether the parity timer counts up or down is returned to the validity lead. No reset of the parity timer occurs. If the code being received from the second latch is not the same as the code in the third latch, the third latch is clocked, making the code in the second latch the new contents of the third latch. The parity timer receives a reset signal at the same time. Control of whether the parity timer counts up or down returns to the validity lead.

The counting range of the parity timer is limited so that it cannot count down any further after reaching 0 and it cannot count up any further after reaching some predetermined maximum count. When it reaches its maximum an internal flip-flop is set. This does two things. First, it causes the contents of the third latch to be output from the receiver by output circuitry. Secondly, it disables the parity timer reset. The receiver output circuitry can start only when this flip-flop goes from 0 to 1. Thus before another digit can be output the parity timer must count down to 0. This resets the flip-flop and re-enables the parity timer reset function so that code changes can reset the parity timer.

The purpose of disabling the parity timer reset function is to prevent outpulsing of two digits when a good digit is interrupted momentarily by noise or a signal dropout after having once driven the parity timer to maximum. The dropout or code changing must continue long enough for the parity timer to reach 0.

DESCRIPTION OF THE DRAWING

The single sheet of the accompanying drawing is a combined logic and functional diagram of a parity checking circuit in accordance with the present invention.

It should be noted that certain portions of the circuit of the present invention are shown in logic form. The details of such circuitry do not form a portion of the present invention. Rather the only requirement be that they perform the function as described in the specification. They may be implemented with any well known form of such circuitry that provides such function.

PREFERRED EMBODIMENT

Referring to the drawing, this invention uses known logic gates and flip-flop elements. The first latch and second latch are simply five separate D flip-flops each with the clock leads tied in common. The third latch is four D flip-flops with the clock leads tied in common. The digital one shot 38 is implemented using a six stage shift register with "Exclusive OR" feedback to the first stage from the fifth and sixth stages. The triggering pulse presets the bit pattern 111100 into the register. The output goes high and remains high until the register shifts into the all 0 state after 60 shifts at which time the input to the first stage is forced to zero until the next triggering pulse. This technique is well known and could be implemented in many other ways.

The parity timer 44 is implemented as a 9 bit shift left/shift right shift register. It has Exclusive NOR feedback from stages 5 and 9 to stage 1 for the shift right (count up) function and Exclusive NOR feedback from stages 1 and 6 to stage 9 for the shift left (count down) function. It includes gate logic to detect the all zeros condition, the full count condition (270th. state) and to disable down counting when all zeros is reached and disable up counting when the 270th state is reached. It also includes circuitry to enable re-setting the register to the 60th state when a reset pulse is received. This function could be implemented with a binary counter, arithemtic logic unit, analog integrator or in other ways. Its structure is not basic to the invention.

Pulse generators 40 and 47 are very short (one clock pulse) one shot circuits. They trigger when the input signal goes low to high and the output goes high for one clock period — then low.

Referring to the drawing, the high and low group detector outputs are applied to OR gates 1–6. OR gates 1 and 2 produce outputs which indicate whether any detector is "on" in the high or low group, respectively. OR gates 3 and 4 encode the identity of the detector which is "on" in the high group into a 2-bit code. This code is applied to the input of latches 10 and 11. OR gates 5 and 6 perform the same function for the low frequency group of detectors and the code is applied to latches 12 and 13. The outputs of OR gates 1 and 2 are applied to AND gate 9 which produces a "validity" signal which represents whether, at each instant, there is one detector "on" from each group. The outputs of OR gates 1 and 2 are further applied to one input of AND gates 7 and 8 respectively. The other input of AND gate 7 is tied back to a pulse generator included in the tone signal receiving equipment connected to the telephone line, which is triggered by every fourth high-going zero crossing of the high group tone input. The AND of this signal and the output of gate 1 produces the sampling signal for latches 10 and 11 which are D flip-flops sampling on a low to high transition of this signal. This is done because the type of detector used can only change its output at the fourth high going zero crossing of the input. Note that in this arrangement, the latch outputs of 10 and 11 can only change when the detector which is "on" changes, and not merely when detectors turn "off". The same arrangement is used for latches 12 and 13, OR gate 2, and AND gate 8, except that the second input of gate 8 goes to a fourth low to high zero crossing detector on the low group input.

The outputs of latches 10, 11, 12, 13 and AND gate 9 are applied to the first latch consisting of latch circuits 14, 15, 16, 17, 18. This stage of latch is sampled by the clock and forces the signals to be synchronous with the clock. The output of the first latch is applied to the second latch, 19–23 which is also sampled by the clock. The second latch provides a one clock period delay for the signal during which Exclusive OR gates 24–27 indicate whether either the low or high group code has changed. If a code change has taken place, one or more of the Exclusive OR gates 24–27 will have a 1 output and OR gate 28 will have a 1 output. The outputs of the second latch are applied to the third latch 29–32 which is sampled by the output of pulse generator 40 in a manner to be described later. Exclusive OR gates 33–36 and NOR gate 37 form a circuit which gives a 0 output at the output of 37 if the contents of the second and third latches are different and a 1 otherwise. When the contents of the second and third latches are different, the 0 at the output of gate 37 and the 0 at the output of pulse generator 40 combine to produce a 1 at the output of gate 41 which forces a 0 at the output of gate 43 forcing the parity timer to count down. The output of gate 28 is applied to the input of the code change timer consisting of digital one shot 38, gate 39 and pulse generator 40.

If gate 28 output is a 1, indicating a code change, the digital one shot 38 is triggered. This forces the output of gate 39 to 0 (if the contents of the second and third latches are the same, it was 0 before). If, when the digital one shot times out, the contents of the second and third latches are different, the output of gate 39 will go high and the pulse generator 40 produces a pulse. This samples the third latch and, if flip-flop 46 is in the 0 state, resets the parity timer via OR gate 45. Also associated with the parity timer 44, are gates 41 and 43, and inverters 42 and 48. The contents of the third latch are now the same as the contents of the second latch and the up/down counting of the parity timer is once again controlled by the output of latch 21 (part of the second latch).

When the parity timer reaches its full count, associated flip-flop 46 is set, parity timer reset is disabled via gates 45 and 48 and a pulse is sent to the output circuitry by pulse generator 47 allowing an output to be produced using the outputs of the third latch as indicators of the received digit.

Because flip-flop 46 can only be reset by the parity timer reaching 0 by counting down, the parity timer must go all the way down to 0 and back up to "full" before another digit can be output.

While but a single embodiment of the present invention has been shown, it will be obvious to those skilled in the art that numerous modifications may be made without departing from the spirit and scope of the present invention which shall be limited only by the claims appended hereto.

What is claimed is:

1. A parity checking circuit, connected to a source of clock pulses, and to first and second groups of tone detector circuits, for detecting the concurrent detection of a tone signal by one of said tone detector in each of said first and second tone detector groups, comprising: latching means including a plurality of first circuit inputs connected to said tone detector first group and a plurality of second circuit inputs connected to said tone detector second group and an enablement circuit input connected to said clock pulse source; parity timing means including a plurality of input circuits and an output operable to generate an output signal in response to detection of a tone by one of said tone detectors in said first group coincidental with detection of a tone by one of said tone detectors in said second group, said parity timing means output signal generated a predetermined time after said tone detections; code change timing means including an input circuit, and an output circuit connected to said parity timing means and to said latching means; and code change detection means including an input circuit from said latching means and a first output circuit connected to said code change timing means input circuit and a second output circuit connected to the input of said parity timing means; said latching means initially operated in response to a first clock pulse from said clock pulse source to register the detection of tones by said tone detector groups; said code change detection means initially operated in response to said registration by said latching means and said code change timing means conditioned in response to the operation of said code change detection means; said latching means further operated in response to a second clock pulse from said source to further register said detection of a tone by each of said first and second tone detector groups; said code change detection means further operated in response to said further registration; said parity timing means conditioned in response to said code change detection means further operation; said code change timing means operated a predetermined period of time after said conditioning to further condition said parity timing means; said latching means additionally operated in response to operation of said code change timing means to additionally register said detection of a tone in each of said tone detector groups; and said parity timing means operated a predetermined period of time after said initial and said further conditioning to generate said output signals.

2. A parity checking circuit as claimed in claim 1, wherein: said latching means comprise first, second and third latch circuits.

3. A parity checking circuit as claimed in claim 2, wherein: said first latch circuit includes a plurality of first circuit inputs connected to said tone detector first group and a plurality of second circuit inputs connected to said tone detector second group, an enablement circuit input connected to said clock pulse source and a plurality of output circuits; said first latch operated in response to a first clock pulse from said clock pulse source to register the detection of tones by said tone detector groups.

4. A parity checking circuit as claimed in claim 2, wherein: said second latch circuit includes a plurality of first circuit inputs connected to said first latch, an enablement circuit input connected to said clock pulse source and a plurality of circuit outputs; said second latch operated in response to a second clock pulse from said clock pulse source to further register the detection of tones by said tone detector groups.

5. A parity checking circuit as claimed in claim 2, wherein: said third latch includes a plurality of first circuit inputs connected to said second latch, an enablement circuit input connected to said code change timing means and a plurality of circuit outputs; said third latch operated in response to said code change timing means to additionally register the detection of tones by said tone detector groups.

6. A parity checking circuit as claimed in claim 2, wherein: said code change detecting means includes first and second detectors.

7. A parity checking circuit as claimed in claim 6, wherein: said first detector includes a plurality of input circuit connections to said second latch and an output circuit connected to said code change timing means; said first detector operated in response to said first latch circuit operation to condition said code change timing means.

8. A parity checking circuit as claimed in claim 6, wherein: said second detector includes a plurality of circuit input connections connected to said third latch circuit and an output circuit connected to said parity timing means; said second detector operated in response to said second latch circuit operation to condition said parity timing means.

9. A parity checking circuit as claimed in claim 7, wherein: said code change timing means includes an input circuit connection to said first detector and an output circuit connected to said parity timing means and to said third latch circuit operated a predetermined period of time after conditioning by said first detector to generate an output signal to condition said parity timing means and to enable said third latch circuit to register the detection of tones by said tone detector groups.

10. A parity checking circuit as claimed in claim 8, wherein: said second detector output circuit is further connected to said code change timing means; and in response to said second detector operation said code change timing means are conditioned.

* * * * *